US007267476B2

(12) United States Patent
Rutigliano et al.

(10) Patent No.: US 7,267,476 B2
(45) Date of Patent: Sep. 11, 2007

(54) DUAL HANDLE IMMERSION BLENDER

(75) Inventors: Gerard A. Rutigliano, Ridgefield, CT (US); Jerry E. Stuart, New Hartford, CT (US); Frank R. Chiappetta, Woodbury, CT (US); Fabrizio Bottero, Greenwich, CT (US)

(73) Assignee: Conair Corporation, Stamford, CT (US)

( * ) Notice: Subject to any disclaimer, the term of this patent is extended or adjusted under 35 U.S.C. 154(b) by 37 days.

(21) Appl. No.: 10/720,729

(22) Filed: Nov. 24, 2003

(65) Prior Publication Data

US 2005/0111296 A1 May 26, 2005

(51) Int. Cl.
*A47J 43/044* (2006.01)

(52) U.S. Cl. ...................................................... 366/129

(58) Field of Classification Search ................ 366/129, 366/64–65, 349; 416/69, 70 R; 16/110.1; 81/489; D8/300; 172/329
See application file for complete search history.

(56) References Cited

U.S. PATENT DOCUMENTS

| | | | | | |
|---|---|---|---|---|---|
| 1,372,279 | A | * | 3/1921 | Collins | 416/122 |
| 1,539,069 | A | * | 5/1925 | Brocktt | 310/50 |
| 1,593,706 | A | * | 7/1926 | Skoog | 366/65 |
| 1,928,965 | A | * | 10/1933 | Dormeyer | 173/170 |
| 2,048,183 | A | * | 7/1936 | Dormeyer | 416/122 |
| 2,093,586 | A | * | 9/1937 | Day | 425/456 |
| 2,148,765 | A | * | 2/1939 | Mall | 366/122 |
| 2,276,613 | A | * | 3/1942 | Gordon | 366/122 |
| 2,278,839 | A | * | 4/1942 | Douglass | 366/123 |
| 2,430,817 | A | * | 11/1947 | Jackson | 173/170 |
| 2,477,150 | A | * | 7/1949 | Yost et al. | 310/50 |
| 2,552,023 | A | * | 5/1951 | Andresen | 74/665 K |
| 2,598,565 | A | * | 5/1952 | Lagant | 173/216 |
| 2,789,799 | A | * | 4/1957 | Kaufman | 416/240 |
| 2,789,800 | A | * | 4/1957 | Willems | 366/263 |
| 2,804,290 | A | * | 8/1957 | Kaufman | 366/331 |
| 2,805,050 | A | * | 9/1957 | Choppinet | 415/8 |
| 2,975,848 | A | * | 3/1961 | Roberts | 173/216 |
| 3,166,303 | A | * | 1/1965 | Chapman | 366/129 |
| 3,299,924 | A | * | 1/1967 | Hanschitz | 241/282.2 |
| 3,333,830 | A | * | 8/1967 | Spingler et al. | 366/129 |
| 3,333,831 | A | * | 8/1967 | Chapman | 366/129 |
| 3,722,835 | A | * | 3/1973 | Knott | 366/65 |
| 3,828,861 | A | * | 8/1974 | Verkuil | 173/26 |
| D271,176 | S | * | 11/1983 | Zimnowicz | D7/379 |
| D308,001 | S | * | 5/1990 | Ricard | D7/376 |
| D327,603 | S | * | 7/1992 | van Asten | D7/376 |
| 5,231,727 | A | * | 8/1993 | Armbruster | 15/97.1 |

(Continued)

FOREIGN PATENT DOCUMENTS

CA 2007663 * 5/1994

(Continued)

*Primary Examiner*—Charles E. Cooley
(74) *Attorney, Agent, or Firm*—Lawrence Cruz

(57) ABSTRACT

There is provided an immersion blender essentially having a housing or body portion for containing a drive motor, a shank or drive shaft operatively connected to the drive motor, and a processing tool operatively connected to the drive shaft. The immersion blender also has one or more handle portions, including, a first handle for pivotal control of the blender during operative use, a second handle for lateral control of the blender during operative use, and a third handle for stabilization of the blender during operative use. These handles effectuate a more effective and efficient operation of the immersion blender.

5 Claims, 3 Drawing Sheets

U.S. PATENT DOCUMENTS

D345,076 S * 3/1994 Saltet .......................... D7/376
5,316,382 A * 5/1994 Penaranda et al. .......... 366/129
5,332,310 A * 7/1994 Wells ......................... 366/129
5,368,384 A * 11/1994 Duncan et al. ............. 366/129
D361,241 S * 8/1995 Littmann ..................... D7/376
D383,938 S * 9/1997 Littmann ..................... D7/376
D392,504 S * 3/1998 Lallemand ................... D7/376
D396,775 S * 8/1998 Arita et al. .................. D7/376
5,794,300 A * 8/1998 McCracken et al. ......... 15/97.1
5,803,598 A * 9/1998 Harry et al. ................ 366/129
D408,214 S * 4/1999 Cousins ....................... D7/376
6,079,865 A * 6/2000 Plavcan et al. ............. 366/129
6,148,701 A * 11/2000 Lee ............................ 81/489
6,168,507 B1 * 1/2001 McCracken ................. 451/357
6,193,404 B1 * 2/2001 Calange ...................... 366/129
6,273,601 B1 * 8/2001 Hlavka et al. .............. 366/129
D447,380 S * 9/2001 Feil ............................ D7/376
D456,206 S * 4/2002 Feil ............................ D7/376
6,543,926 B2 * 4/2003 Sherez ....................... 366/108
6,592,441 B2 * 7/2003 McCracken et al. ........ 451/357
D485,729 S * 1/2004 Patton et al. ................ D7/379
D494,410 S * 8/2004 Stuart et al. ................. D7/379
6,810,547 B2 * 11/2004 Hung ........................... 15/28
6,974,244 B1 * 12/2005 Lin ............................ 366/129
7,172,334 B2 * 2/2007 Chiappetta .................. 366/129
2005/0078549 A1 * 4/2005 Hamelin ..................... 366/129
2005/0111296 A1 * 5/2005 Rutigliano et al. ......... 366/129
2005/0128865 A1 * 6/2005 Chiappetta .................. 366/129
2005/0281130 A1 * 12/2005 Hsieh ......................... 366/129

FOREIGN PATENT DOCUMENTS

EP 1230883 A2 * 8/2002
FR 2766080 * 1/1999
JP 60-179127 * 9/1985

* cited by examiner

DUAL HANDLE IMMERSION BLENDER

BACKGROUND OF THE INVENTION

1. Field of the Invention

The present invention relates to blenders. More particularly, the present invention relates to a hand held blender.

2. Description of the Related Art

Hand held blenders including immersion blenders, are well known. Typically, these blenders have a tall, tubular hand grip portion that contains a motor, from which extends a shaft that may be immersed right into a liquid or mixture to puree or chop the contents. Many immersion blenders come with a whisk attachment (good for whipping cream), and other accoutrements, such as strainers or beakers, for mixing individual drinks. Some also come with wall mounts. In addition, these blenders may have variable speeds and be entirely portable.

Immersion blenders are very practical for their specific purpose. Conventionally, such blenders are used in combination with any of a variety of separate containers to process (e.g., mix, chop, cut, etc.) any of a variety of different food stuffs of various consistencies from solid to viscous to liquid.

During the comminuting or mixing process, it can often be difficult and/or awkward to control or manipulate these blenders because the hand grip portions are primarily designed to conform to the geometry of the motor contained therein rather than to ergonomically conform to a person's hand or hands. Accordingly, notwithstanding what is currently known in relation to immersion blenders, there remains a need for an immersion blender having one or more ergonomic hand grip portions suitable to facilitate easy control and/or manipulation of the blender during use.

SUMMARY OF THE INVENTION

It is an object of the present invention to provide an effective and versatile immersion blender that has one or more ergonomic handle portions.

It is another object of the present invention to provide an immersion blender that has a handle portion facilitating a pivotal movement of the blender.

It is still another object of the present invention to provide an immersion blender that has a handle portion facilitating lateral movement of the blender.

It is yet another object of the present invention to provide an immersion blender that has a handle portion that facilitates stabilizing various operative movements of the blender.

It is a further another object of the present invention to provide an immersion blender that facilitates uniform blending and/or comminuting results via effective and efficient handling of the blender.

These and other objects and advantages of the present invention are achieved by an immersion blender that has a housing or body containing a motor, a drive shaft extending from one end of the body and operatively connected to the motor, and a processing tool operatively connected to the drive shaft. The body has at least one handle portion, and preferably two or more handle portions that are ergonomically configured to facilitate in the operative movement of the blender, better overall control and more uniform blending.

DETAILED DESCRIPTION OF THE INVENTION

Figure 1:
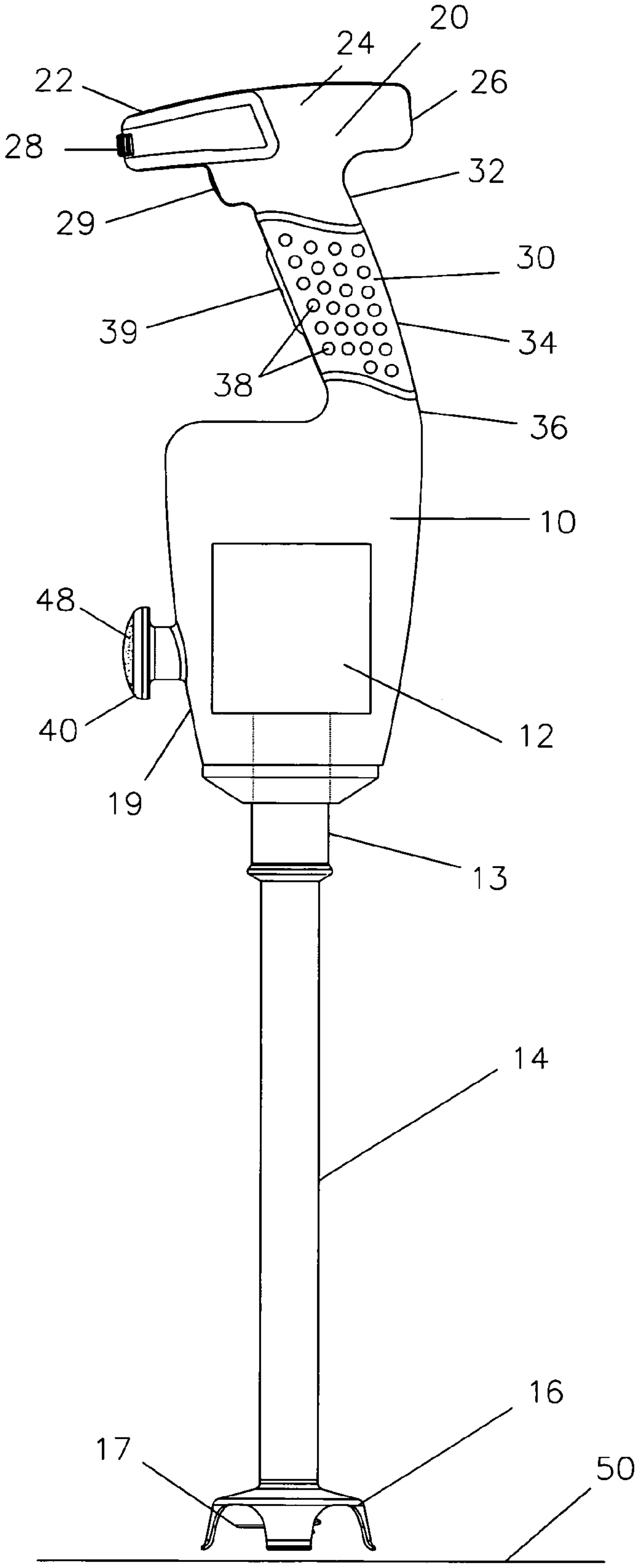
FIG. 1 is a first side view of an immersion blender in accordance with an illustrative embodiment of the present invention.

Referring to the drawings and, in particular, FIG. 1, an immersion blender in accordance with an illustrative embodiment of the present invention is shown and generally represented by reference numeral 1. Immersion blender 1 essentially has a housing or body 10 for containing a drive motor 12, a shank or drive shaft 14 operatively connected to drive motor 12, and a processing tool 16 operatively connected, either removably or non-removably, to drive shaft 14.

Additionally, blender 1 preferably also has one or more handle portions preferably associated with body 10. In a preferred aspect of the present invention, these one or more handle portions may include at least a first handle 20 for facilitating pivotal control of blender 1 during operative use, a second handle 30 for facilitating lateral control of the blender during operative use, and a third handle 40 for facilitating stabilization of the blender during operative use. Other handle portions may also and/or alternately be provided as appropriate to effectuate a more effective and efficient operation of blender 1.

Figure 2:
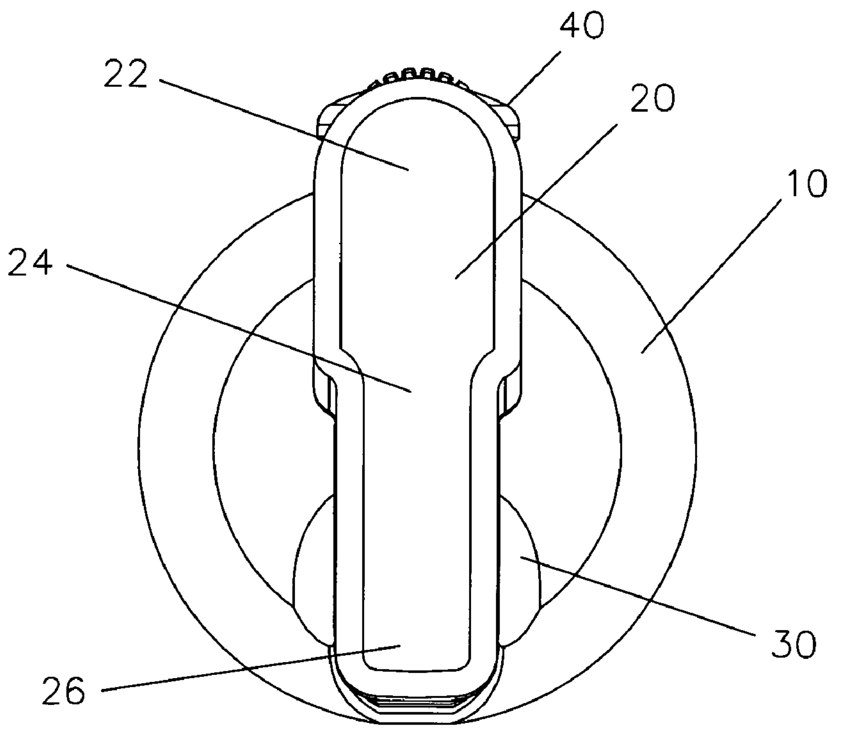
FIG. 2 is a top view of the immersion blender of FIG. 1.

Referring to FIGS. 1 and 2, in one aspect of the present invention, first handle 20 may be ergonomically shaped, sized and/or configured for optimal comfort, efficiency, safety, and ease of use. For example, as shown, first handle 20 can be elongated with a first proximal end 22, a first central portion 24, and a first distal end 26. Preferably, first proximal end 22 and first distal end 26 are sufficient to enable the operator's hand to grasp and/or wrap thereabout preferably in a natural comfortable manner. First central portion 24 is preferably shaped to comfortably accommodate the palm of a person's hand.

In operation, first handle 20 preferably has a substantially horizontal orientation with respect to a working surface 50. This orientation allows the operator to better control the vertical orientation of blender 1 with respect to working surface 50. Preferably, first handle 20 can also have one or more surface structures 28 for improving the operator's interface during operative use. In addition, second handle 20 can accommodate one or more controls 29 for operating blender 1. Ideally, first handle 20 improves the operator's ability to pivotally manipulate blender 1, thereby facilitating the optimal positioning of tool 16 with respect to any of a variety of curved surfaces associated with any of a variety of mixing containers or bowls.

Figure 3:
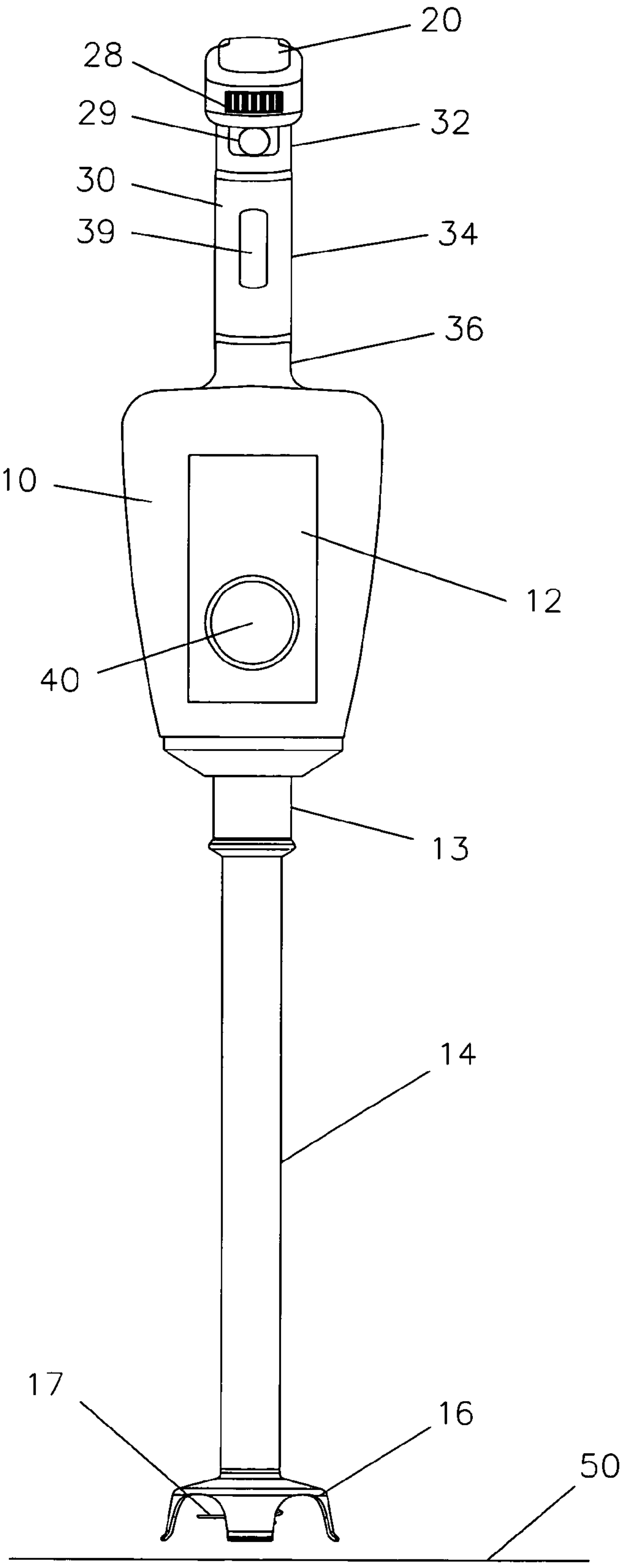
FIG. 3 is a second side view of the immersion blender of FIG. 1.

Referring to FIGS. 1 and 3, in another aspect of the present invention, second handle 30 may also be ergonomically shaped, sized and/or configured for optimal comfort, efficiency, safety, and ease of use. For example, as shown, second handle 30 can be elongated with a second proximal end 32, a second central portion 34, and a second distal end portion. Preferably, second handle 30 is sufficient to enable the operator's hand to grasp and/or wrap thereabout preferably in a natural comfortable manner. Second proximal end 32 preferably intersects first handle 20 at or about first central portion 24 and second distal end 36 preferably connects second handle 30 to body 10, preferably at a top portion 18 thereof.

In operative use, second handle 30 preferably has a substantially vertical orientation, which allows the operator to better control the lateral movement of blender 1 with respect to working surface 50. Second handle 30, like first handle 20, can also have one or more surface structures 38 for improving the operator's interaction therewith during operation, such as, for example, grippers. Further, second handle 30 can accommodate one or more controls 39 for operating blender 1. Ideally, second handle 30 improves the operator's ability to move or manipulate blender 1 so that tool 16 may be laterally moved in a vertical orientation with respect to working surface 50.

Thus, first handle 20 and second handle 30, together, cooperate to give the operator greater control and flexibility of blender 1 during use or operation. In addition, first and second handles 20, 30 preferably cooperate so that when second handle 30 is grasped by the operator, first handle 20 rests on the upper portion of the operator's hand, thereby making it easier to bear the weight of blender 1.

Figure 4:
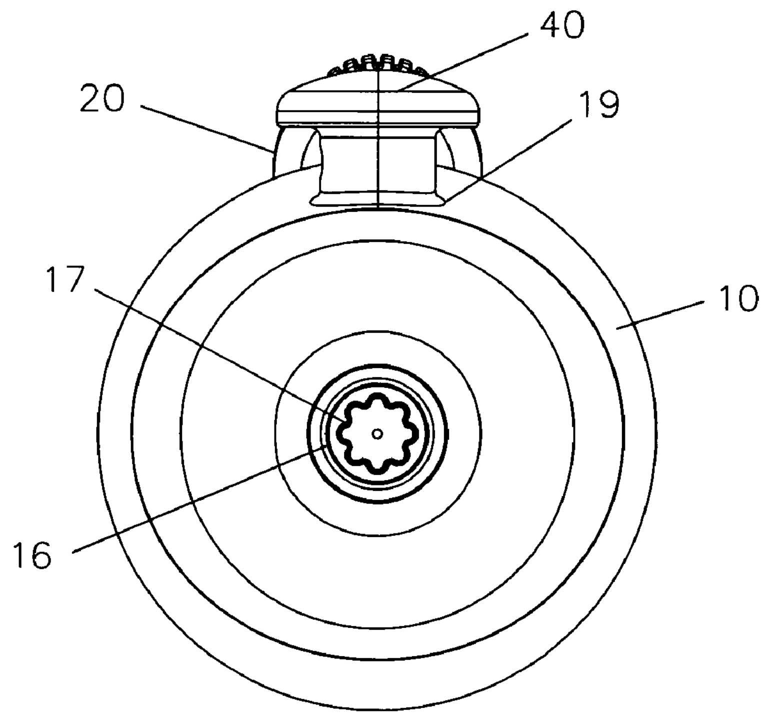
FIG. 4 is a bottom view of the immersion blender of FIG. 1.

Referring to FIGS. 1 and 4, in still another aspect of the present invention, third handle 40 may also be ergonomically shaped, sized and/or configured for optimal comfort, efficiency, safety, and ease of use. For example, as shown, third handle 40 can have a relatively low profile with a third proximal end 42 and a third distal end 44. Preferably, third handle 40 is sufficient to allow the operator to grasp or hold in a natural comfortable manner. For example, third handle 40 can have grippers 48 and/or be made of any of a variety of materials for providing a variety of different ergonomic gripping surfaces. Third proximal end 42 can have any of a variety of forms, such as, for example, the annular knob as shown. Preferably, third distal end 44 connects third handle 40 to body 10, preferably at a side portion 19 thereof.

In operation, third handle 40 preferably protrudes outwardly from body 10 in a direction substantially perpendicular to an axis defined by the drive shaft 14 as seen in FIG. 1. Third handle 40 preferably allows the operator to better stabilize the disposition of blender 1 with respect to working surface 50 and/or mixing container. Third handle 40, like first and second handles 20, 30, can have one or more surface structures, such as, for example, grippers 48 for improving the operator's interaction therewith during operation. Ideally, third handle 40 improves the operator's ability to keep blender 1 stable so that tool 16 may more easily be moved in a smooth consistent manner as desired.

Thus, the one or more handles 20, 30, 40 of the present invention preferably cooperate to give the operator greater control and flexibility of blender 1 during operation. In addition, the one or more handles 20, 30, 40 may be detachably connected to body 10 to facilitate efficient storage.

The present invention having been thus described with particular reference to the preferred forms thereof, it will be obvious that various changes and modifications may be made therein without departing from the spirit of the present invention as defined herein.

What is claimed is:

1. An immersion blender comprising:

a body housing a drive motor;

a first handle;

a second handle having a first end and a second end, said first end being attached to said first handle, said second end being attached to an upper half of said body;

a drive shaft operatively connected to said drive motor;

a third handle, extending outward from a lower half of said body in a direction substantially perpendicular to an axis defined by said drive shaft; and a tool operatively connected to said drive shaft, wherein said first handle is elongated with a proximal end portion, a central portion and a distal end portion, wherein said proximal end and said distal end enable an operator's hand to easily grasp or wrap thereabout, and wherein said central portion is connected to said second handle.

2. An immersion blender comprising:

a body housing a drive motor;

a first handle;

a second handle having a first end and a second end, said first end being attached to said first handle, said second end being attached to an upper half of said body;

a drive shaft operatively connected to said drive motor;

a third handle, extending outward from a lower half of said body in a direction substantially perpendicular to an axis defined by said drive shaft; and a tool operatively connected to said drive shaft, wherein said third handle is a knob.

3. A hand held blender comprising:

an elongated body having a drive motor, said body having two or more handles;

a drive shaft operatively connected to said drive motor;

a tool operatively connected to said drive shaft, wherein a first handle of said two or more handles is attached to an upper half of said body, and a second handle of said two or more handles is attached to a lower half of said body, said second handle extending outward from said body in a direction substantially perpendicular to an axis defined by said drive shaft, wherein at least one of said two or more handles is a stabilizing handle disposed on a side of said body, wherein said stabilizing handle is a knob.

4. A blender comprising:

a body housing a drive motor;

a drive shaft operatively connected to said drive motor; and a tool operatively connected to said drive shaft, wherein said body has a first handle to facilitate pivoting the blender with respect to a working surface, a second handle to facilitate moving the blender laterally with respect to said working surface, and a third handle to facilitate stabilizing the blender during operative use, said third handle being located in a position on said body remote from said first handle and said second handle, wherein said first handle is elongated with a proximal end portion, a central portion and a distal end portion, wherein said proximal end and said distal end enable an operator's hand to easily grasp or wrap thereabout, and wherein said central portion is connected to said second handle.

5. A blender comprising:

a body housing a drive motor;

a drive shaft operatively connected to said drive motor; and a tool operatively connected to said drive shaft, wherein said body has a first handle to facilitate pivoting the blender with respect to a working surface, a second handle to facilitate moving the blender laterally with respect to said working surface, and a third handle to facilitate stabilizing the blender during operative use, said third handle being located in a position on said body remote from said first handle and said second handle, wherein said third handle protrudes outwardly from a side of said body in a direction substantially perpendicular to an axis defined by said drive shaft, wherein said third handle is a knob.

* * * * *